(12) United States Patent
Tanaka

(10) Patent No.: US 7,612,827 B2
(45) Date of Patent: Nov. 3, 2009

(54) IMAGE PROCESSING APPARATUS AND METHOD

(75) Inventor: Tetsuro Tanaka, Tokyo (JP)

(73) Assignee: Sony Corporation (JP)

(*) Notice: Subject to any disclaimer, the term of this patent is extended or adjusted under 35 U.S.C. 154(b) by 780 days.

(21) Appl. No.: 11/370,961

(22) Filed: Mar. 8, 2006

(65) Prior Publication Data

US 2006/0215057 A1 Sep. 28, 2006

(30) Foreign Application Priority Data

Mar. 9, 2005 (JP) .............................. 2005-066052

(51) Int. Cl.
*H04N 7/01* (2006.01)
*H04N 11/20* (2006.01)

(52) U.S. Cl. ........................ 348/448; 348/452; 348/443

(58) Field of Classification Search ......... 348/441–459, 348/700–702, 615, 616
See application file for complete search history.

(56) References Cited

U.S. PATENT DOCUMENTS

| | | | | |
|---|---|---|---|---|
| 3,716,670 A | * | 2/1973 | Lowry | 386/114 |
| 4,941,045 A | * | 7/1990 | Birch | 348/448 |
| 5,327,241 A | * | 7/1994 | Ishizu et al. | 348/606 |
| 6,041,142 A | | 3/2000 | Rao et al. | |
| 6,563,550 B1 | * | 5/2003 | Kahn et al. | 348/700 |
| 7,432,979 B2 | * | 10/2008 | Tanaka | 348/448 |
| 2003/0122968 A1 | * | 7/2003 | Min | 348/607 |
| 2005/0195325 A1 | | 9/2005 | Tanaka | |

FOREIGN PATENT DOCUMENTS

| | | |
|---|---|---|
| JP | 07-193789 A | 7/1995 |
| JP | 11-055630 A | 2/1999 |
| JP | 2000-341648 A | 12/2000 |
| JP | 2002-247529 A | 8/2002 |
| JP | 2003-101970 A | 4/2003 |
| JP | 2004-343333 A | 12/2004 |
| JP | 2005-102191 A | 4/2005 |

* cited by examiner

*Primary Examiner*—M. Lee
(74) *Attorney, Agent, or Firm*—Lerner, David, Littenberg, Krumholz & Mentlik, LLP

(57) ABSTRACT

An image processing apparatus converts an interlaced signal including a signal converted so as to be matched to a frame rate of an input video signal with original images arranged on a basis of a predetermined sequence as the video signal into a progressive signal. The image processing apparatus includes a field-interpolated signal generator generating a progressive field-interpolated signal by interpolating a signal at a selected position corresponding to a scanning line to be interpolated in a present field, the signal at the selected position belonging to one of a field preceding the present field and a field succeeding the present field; and a double image detector determining whether a pixel in the field-interpolated signal forms a part of a double image, and replacing a pixel in the field-interpolated signal which forms a part of a double image in the field-interpolated signal with a predetermined substitute signal.

20 Claims, 10 Drawing Sheets

FIG.7

|   | DOUBLE IMAGE | | DOUBLE IMAGE | | |
|---|---|---|---|---|---|
| A | 1 | 1 | 0 | 1 | 1 |
| B | 0 | 1 | 1 | 1 | 1 |
| C | 1 | 1 | 0 | 1 | 0 |
| D | 0 | 0 | 1 | 1 | 0 |
| E | 1 | 1 | 0 | 1 | 1 |

IMAGE PROCESSING APPARATUS AND METHOD

CROSS-REFERENCE TO RELATED APPLICATIONS

The present application claims priority from Japanese Patent Application No. JP 2005-066052 filed on Mar. 9, 2005, the disclosure of which is hereby incorporated by reference herein.

BACKGROUND OF THE INVENTION

The present invention relates to an apparatus and a method for image processing that are suitable for use in converting an interlaced signal including a converted signal converted into an interlaced signal by 3-2 pulldown, 2-2 pulldown or the like and resulting from an editing process into a progressive signal.

Standard video signals such as an NTSC signal, a high-definition television signal and the like are interlaced signals. FIGS. 9A, 9B, and 9C are diagrams showing scanning line structures, FIG. 9A representing an interlaced signal, FIG. 9B representing a progressive signal, and FIG. 9C representing a signal obtained by converting an interlaced signal into a progressive signal by scanning line interpolation. Incidentally, the symbol of a circle (○) in FIG. 9 represents a scanning line, and the symbol of a cross (x) in FIG. 9 represents an interpolated scanning line.

In FIG. 9, a vertical direction V is the vertical direction of a screen, and a horizontal direction t is a time direction. As shown in FIG. 9A, one frame of an interlaced signal is formed by two fields shifted from each other in the time direction and the vertical direction. On the other hand, there is no shift in the scanning line structure of a progressive signal, as shown in FIG. 9B. In the case of the interlaced signal, an interlace disturbance such as line flicker or the like occurs when a high-frequency component in the vertical direction of an image is increased. On the other hand, the progressive signal is free from the interlace disturbance.

As shown in FIG. 9C, there is a processing method for eliminating the interlace disturbance by interpolating a scanning line in a part discretely reduced by the interlace using neighboring scanning lines, and thereby converting the interlaced signal into a progressive signal. Such a processing method is referred to as progressive conversion or double density conversion.

In the case of an interlaced signal originating from normal video, scanning line interpolation for progressive conversion is performed by a motion adaptive type interpolation process. Specifically, as shown in FIG. 10, when an image is still, a new scanning line is formed by performing inter-field interpolation using an average value of signals PA and PB representing pixels in a previous field and a subsequent field as a signal PQ representing a new pixel denoted by a cross (x) symbol. On the other hand, when an image is moving, a new scanning line is formed by performing intra-field interpolation using an average value of signals PC and PD representing vertically adjacent pixels as the signal PQ representing a new pixel denoted by the cross (x) symbol. Thus, when an image is still, excellent quality of a converted image with little aliasing and high resolution can be obtained. However, when an image is moving, the quality of a converted image is degraded with much aliasing and low resolution.

In a case where an input signal to be converted into a progressive signal includes a converted signal originating from film video which signal is converted by 3-2 pulldown, 2-2 pulldown or the like, excellent converted image quality can be obtained even when the image is moving, by employing a method different from the motion adaptive type interpolation process for the part originating from the film video. The 3-2 pulldown is a frame rate conversion as represented in FIG. 11. Specifically, the 3-2 pulldown is used as a method for converting progressive signals A, B, C . . . (hereinafter referred to as "frames A, B, C . . . " as appropriate) of film video having a rate of 24 frames per second or the like into interlaced signals a, a', a, b', b, c', c, c' . . . (hereinafter referred to as "fields a, a', a . . . " as appropriate) of an NTSC system having a rate of 60 fields per second. Incidentally, presence or absence of "'" in FIG. 11 indicates a difference between an odd field and an even field. On the other hand, the 2-2 pulldown is a frame rate conversion as represented in FIG. 12. Specifically, the 2-2 pulldown is used as a method for converting progressive signals A, B, C . . . of film video having a rate of 30 frames per second, for example, into interlaced signals a, a', b, b', c, c' . . . of the NTSC system having a rate of 60 fields per second.

As shown in FIG. 11 and FIG. 12, the 3-2 pulldown divides an image as an originally identical frame into three or two fields, while the 2-2 pulldown divides an image as an originally identical frame into two fields. Hence, when the 3-2 pattern or the 2-2 pattern of a part converted into an interlaced signal by 3-2 pulldown or 2-2 pulldown, that is, a pulldown sequence is known, the interlaced signal can be converted into a progressive signal by performing field interpolation using an adjacent field generated from a same frame regardless of whether the image is still or moving. The field interpolation, which is different as an interpolation method from the inter-field interpolation represented in FIG. 10 but is similar to the inter-field interpolation, generates a new scanning line by setting a signal PA in a previous field or a signal PB in a subsequent field as a signal PQ representing a new pixel. Thus, after the conversion, excellent image quality can be obtained with little aliasing and high resolution. Above described image processing apparatus and method in related art is disclosed, for example, in Japanese Patent Laid-Open No. 2004-343333.

There are cases where the pulldown sequence is disrupted as a result of an editing process performed on a part originating from film video which part has been thus converted into an interlaced signal by 3-2 pulldown, 2-2 pulldown or the like. For example, when 3-2 pulldown as represented in FIG. 11 is performed, an interlaced signal normally has a sequence such as fields a, a', a, b', b, c', c, c', d, and d'. As a result of cutting off the fields c and c' by an editing process as shown in FIG. 13, the interlaced signal can have a sequence such as fields a, a', a, b', b, c', d, and d'.

When the interlaced signal in which the pulldown sequence is thus disrupted by an editing process is converted into a progressive signal, as a result of field interpolation being performed expecting that fields originating from the frame C such as the fields c', c, and c' continue, a frame as indicated by hatch lines in FIG. 13 is generated from the field c' and the field d before and after a boundary between the field c and the field d, as shown in FIG. 13. However, since the field c' and the field d originate from different frames on a time axis, the frame generated from the field c' and the field d is a comb-shaped image, that is, a double image, and thus image quality is greatly impaired.

Incidentally, since such disruption of the sequence is caused by an editing process, the boundary between the field c' and the field d will hereinafter be referred to as an edit point.

In order to solve such a problem, a progressive conversion unit in related art compares the field c' and the field d to be subjected to field interpolation with each other, and detects that the field next to the field c' is the field d rather than the expected field c. However, it is difficult to find an edit point when the field c' and the field d are similar to each other, for example, when only one part of a screen is moving. Consequently, a frame is generated from the field c' and the field d, and thus image quality is greatly impaired.

SUMMARY OF THE INVENTION

The present invention has been proposed in view of such an actual situation in the related art. It is desirable to provide an image processing apparatus and a method thereof that can convert even an interlaced signal including a signal converted into an interlaced signal by 3-2 pulldown, 2-2 pulldown or the like and resulting from an editing process into a progressive signal excellently without degradation in image quality.

According to an embodiment of the present invention, there is provided an image processing apparatus for converting an interlaced signal into a progressive signal, the interlaced signal including a signal converted so as to be matched to a frame rate of an input video signal with original images arranged on a basis of a predetermined sequence as the video signal, the image processing apparatus including field-interpolated signal generating means for generating a progressive field-interpolated signal by interpolating a signal at a selected position corresponding to a scanning line to be interpolated in a present field, the signal at the selected position belonging to one of a field preceding the present field and a field succeeding the present field; and double image detecting means for determining whether a pixel in the field-interpolated signal forms a part of a double image, used for replacing a pixel in the field-interpolated signal which forms a part of a double image with a predetermined substitute signal.

According to an embodiment of the present invention, there is provided an image processing method for converting an interlaced signal into a progressive signal, the interlaced signal including a signal converted so as to be matched to a frame rate of an input video signal with original images arranged on a basis of a predetermined sequence as the video signal, the image processing method including generating a progressive field-interpolated signal by interpolating a signal at a selected position corresponding to a scanning line to be interpolated in a present field, the signal at the selected position belonging to one of a field preceding the present field and a field succeeding the present field; determining whether a pixel in the field-interpolated signal forms a part of a double image of the field-interpolated signal; and replacing a pixel in the field-interpolated signal which forms a part of a double image in the field-interpolated signal with a predetermined substitute signal.

The converted signal is a signal converted into an interlaced signal by 3-2 pulldown or 2-2 pulldown, for example.

The image processing apparatus and the method thereof according to the embodiments of the present invention can convert even an interlaced signal including a signal converted into an interlaced signal by 3-2 pulldown, 2-2 pulldown or the like and resulting from a part of images of the converted signal being subjected to an editing process into a progressive signal excellently without degradation in image quality.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 is a diagram showing an example of a binary pattern of five lines;

DETAILED DESCRIPTION

A concrete embodiment to which the present invention is applied will hereinafter be described in detail with reference to the drawings. This embodiment is an application of the present invention to an image processing apparatus and a method thereof that can convert even an interlaced signal including a converted signal converted into an interlaced signal by 3-2 pulldown or 2-2 pulldown and resulting from an editing process into a progressive signal excellently without degradation in image quality.

Figure 1:
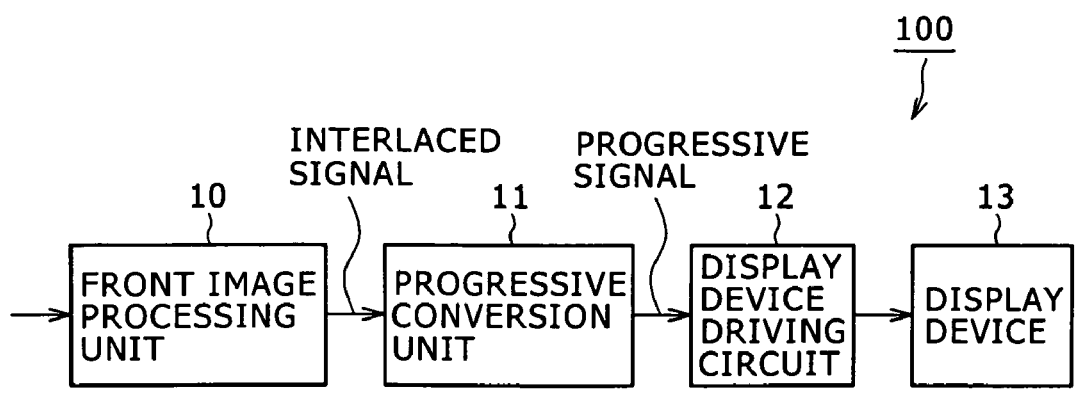
FIG. 1 is a diagram showing an example of an outline of configuration of an image processing apparatus according to an embodiment.

FIG. 1 shows an example of an outline of a configuration of the image processing apparatus according to the present embodiment. As shown in FIG. 1, the image processing apparatus 100 according to the present embodiment includes a front image processing unit 10, a progressive conversion unit 11, a display device driving circuit 12, and a display device 13.

The front image processing unit 10 is supplied with a video signal from various signal sources, such for example as an NTSC signal, a PAL signal, or an HDTV signal from a BS digital tuner. Incidentally, the format of the video signal is the format of an interlaced signal such as 525i (an interlaced signal with 525 lines), 625i, 1125i, or the like.

The progressive conversion unit 11 converts a 525i signal into a 525p signal (a progressive signal with 525 lines), converts a 625i signal into a 625p signal, and converts a 1125i signal into a 1125p signal. At this time, the progressive conversion unit 11 can convert even an interlaced signal including a converted signal converted into an interlaced signal by 3-2 pulldown or 2-2 pulldown and resulting from an editing process into a progressive signal excellently without degradation in image quality, as will be described later. The progressive conversion unit 11 supplies the resulting progressive signal to the display device driving circuit 12.

The display device driving circuit 12 drives the display device 13 to display the progressive signal supplied from the progressive conversion unit 11. As the display device 13, various display devices such as cathode-ray tubes, liquid crystal displays, plasma displays and the like can be used.

Incidentally, the display device driving circuit 12 may include a resolution converting circuit for converting standard-resolution or low-resolution images into high-resolution images including a high-frequency component that is not included in the standard-resolution or low-resolution images. Such a resolution converting circuit is described in Japanese Patent Laid-Open No. Hei 7-193789 or Japanese Patent Laid-Open No. Hei 11-55630, for example.

Figure 2:
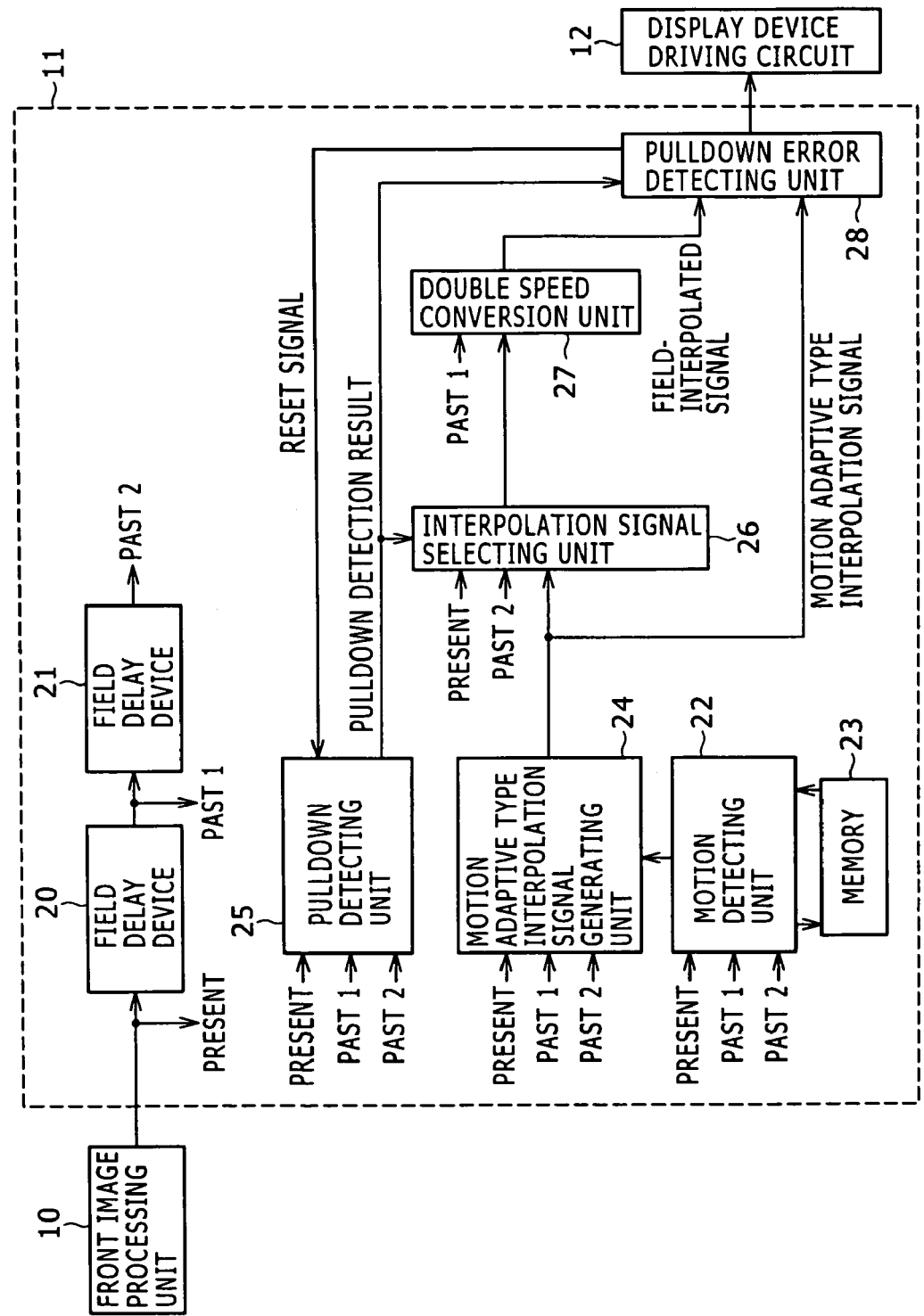
FIG. 2 is a diagram showing an example of internal configuration of a progressive conversion unit in the image processing apparatus.

FIG. 2 shows an example of internal configuration of the above-described progressive conversion unit 11. An interlaced signal input from the front image processing unit 10 is supplied as a present signal to a plurality of blocks in the progressive conversion unit 11. This present signal is delayed by a time of one field to be converted into a past-1 signal by a field delay device 20, and further delayed by a time of one field to be converted into a past-2 signal by a field delay device 21.

A motion detecting unit 22 performs motion detection using the present signal, the past-1 signal, and the past-2 signal. A motion detection determination uses a motion detection determination history indicating whether a pixel stored in a memory 23 has been moving or stood still in the past. The motion detecting unit 22 supplies a result of the motion detection to a motion adaptive type interpolation signal generating unit 24. The motion adaptive type interpolation signal generating unit 24 performs an inter-field interpolation or an intra-field interpolation on the basis of the result of the motion detection to generate a progressive motion adaptive type interpolation signal. Specifically, when the image is still, the motion adaptive type interpolation signal generating unit 24 generates a new scanning line by performing an inter-field interpolation using an average value of pixels in a preceding field and a succeeding field for a new pixel. When the image is moving, on the other hand, the motion adaptive type interpolation signal generating unit 24 generates a new scanning line by performing an intra-field interpolation using, for the new pixel, an average value of pixels vertically adjacent to the new pixel. The motion adaptive type interpolation signal generating unit 24 supplies the generated motion adaptive type interpolation signal to an interpolation signal selecting unit 26 and a pulldown error detecting unit 28.

The pulldown detecting unit 25 detects 3-2 pulldown or 2-2 pulldown from the present signal, the past-1 signal, and the past-2 signal, and thereby detects whether a field being processed is a field originating from film video. Specifically, when the field being processed is a field of a part converted into an interlaced signal by 3-2 pulldown or 2-2 pulldown, there is always an adjacent field originating from the same frame. It is therefore possible to detect 3-2 pulldown or 2-2 pulldown by detecting a field sequence on the basis of presence or absence of inter-field movements (correlations between fields), for example. The pulldown detecting unit 25 supplies a result of the pulldown detection to the interpolation signal selecting unit 26 and the pulldown error detecting unit 28.

In addition, the pulldown detecting unit 25 has a state transition model therewithin. When detecting 3-2 pulldown or 2-2 pulldown, the pulldown detecting unit 25 makes the state transition model transition from a video picture state to a film picture state. When detecting 3-2 pulldown, for example, the pulldown detecting unit 25 makes five states corresponding to three or two fields originating from the same frame make transitions as the film picture state. By using such a state transition model, the pulldown detecting unit 25 determines the position of the field currently being processed in a sequence in which three fields and two fields alternate with each other. Incidentally, when a reset signal to be described later is supplied from the pulldown error detecting unit 28, the pulldown detecting unit 25 returns the state transition model to the video picture state to detect 3-2 pulldown or 2-2 pulldown again even when the pulldown detecting unit 25 is making the film picture state transition.

The interpolation signal selecting unit 26 determines an interpolation signal on the basis of the motion adaptive type interpolation signal, the present signal, the past-2 signal, and the result of the pulldown detection. Specifically, when the field being processed is a field of a part converted into an interlaced signal by 3-2 pulldown or 2-2 pulldown, there is always an adjacent field originating from the same frame. Thus, the interpolation signal selecting unit 26 supplies, as an interpolation signal, the signal (the present signal or the past-2 signal) of the field generated from that same frame to a double speed conversion unit 27. When the field being processed is not a field of a part converted into an interlaced signal by 3-2 pulldown or 2-2 pulldown, the interpolation signal selecting unit 26 supplies, as an interpolation signal, the output signal of the motion adaptive type interpolation signal generating unit 24 to the double speed conversion unit 27. The double speed conversion unit 27 converts the interpolation signal and the past-1 signal into a progressive field-interpolated signal by reading the interpolation signal and the past-1 signal in order at a speed twice that of the input signal. The double speed conversion unit 27 supplies the field-interpolated signal to the pulldown error detecting unit 28.

The progressive conversion unit in related art supplies the display device driving circuit 12 with this field-interpolated signal as it is. However, when the pulldown sequence of a part converted into an interlaced signal by 3-2 pulldown or 2-2 pulldown is disrupted, a frame generated from fields before and after an edit point is a double image, so that the quality of the image is greatly degraded.

Accordingly, the progressive conversion unit 11 in the present embodiment has the pulldown error detecting unit 28 in a stage succeeding the double speed conversion unit 27. The pulldown error detecting unit 28 evaluates the field-interpolated signal. When detecting a double image error, the pulldown error detecting unit 28 replaces the field-interpolated signal with the motion adaptive type interpolation signal. In particular, the pulldown error detecting unit 28 detects a double image error on the basis of surrounding pixel information in pixel units. When detecting a double image error, the pulldown error detecting unit 28 replaces the field-interpolated signal with the motion adaptive type interpolation signal in a pixel unit. When the number of pixels judged to be a double image error reaches a predetermined threshold value, the pulldown error detecting unit 28 selects the motion adaptive type interpolation signal for all of subsequent pixels or lines. Incidentally, this double image detection is performed only when the pulldown detecting unit 25 determines that the field being processed is a field of a part converted into an interlaced signal by 3-2 pulldown or 2-2 pulldown and when the interpolation signal selecting unit 26 uses the present signal or the past-2 signal as pixels to be interpolated.

Figure 3:
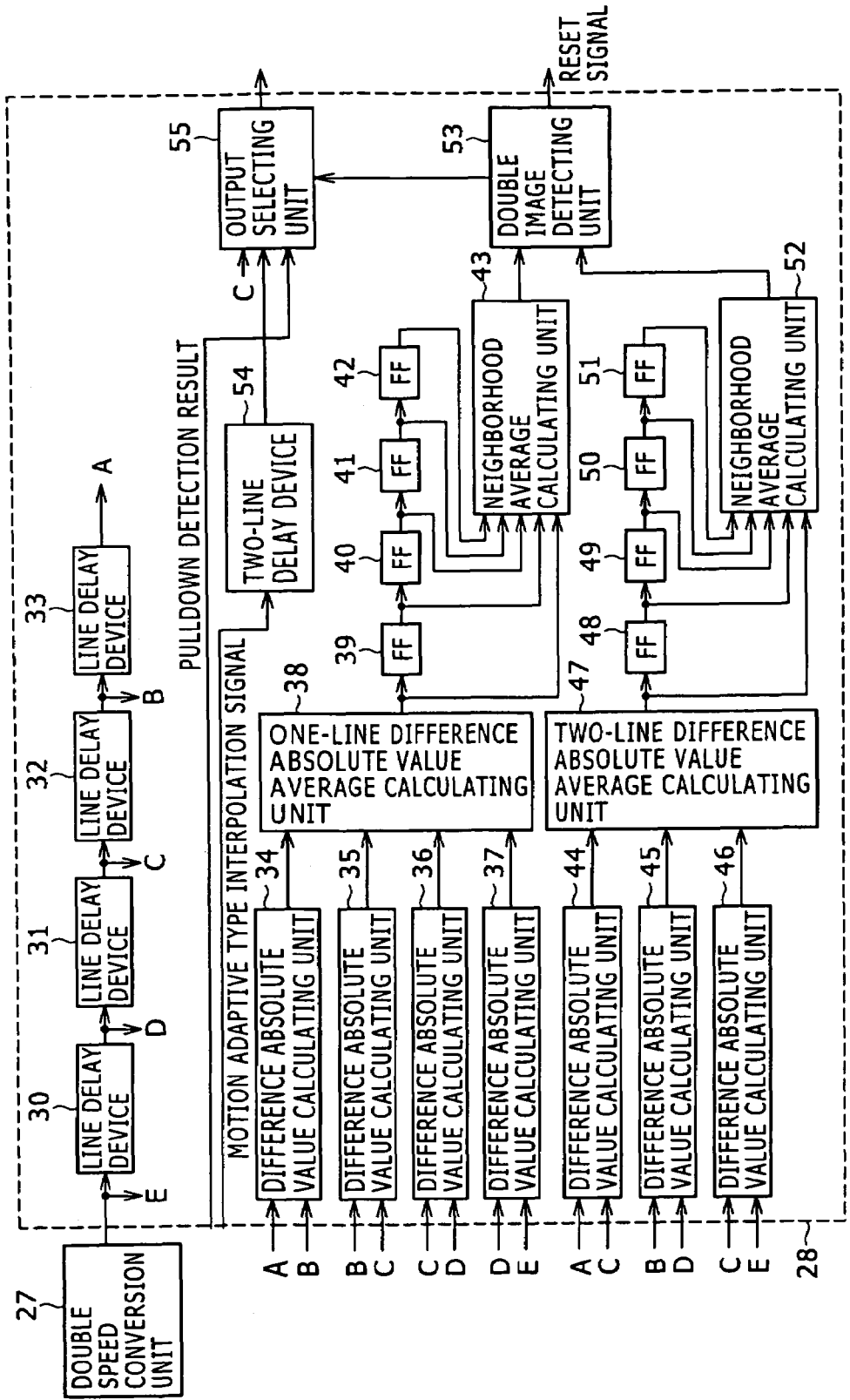
FIG. 3 is a diagram showing an example of internal configuration of a pulldown error detecting unit in the progressive conversion unit.
Figure 4:
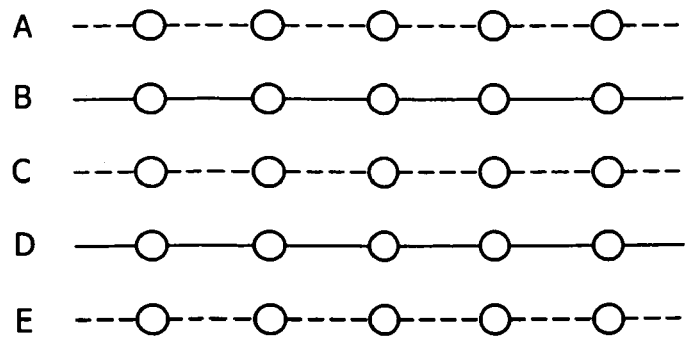
FIG. 4 is a diagram showing the position of line-delayed signals.

FIG. 3 shows an example of internal configuration of the pulldown error detecting unit 28. The field-interpolated signal supplied from the double speed conversion unit 27 is delayed by a time corresponding to one line by a line delay device 30. The field-interpolated signal is further delayed by a time corresponding to one line by each of line delay devices 31, 32, and 33. Finally, signals A, B, C, D, and E are obtained. Positional relation between the signals A, B, C, D, and E are as shown in FIG. 4. Incidentally, a dotted line in the figure represents a scanning line generated by field interpolation, and a straight line in the figure represents a scanning line of the input signal as it is.

When a part converted into an interlaced signal by 3-2 pulldown or 2-2 pulldown is subjected to progressive conversion, lines adjacent to each other after the progressive conversion should have a strong correlation because the adjacent lines originally formed the same frame (original image). On the other hand, when a pulldown sequence is disrupted by an editing process and a frame is generated by two fields originating from different frames (original images), lines vertically adjacent to each other at the time of the interlaced signal, that is, alternate lines at the time of the progressive signal should have a stronger correlation than the lines vertically adjacent to each other at the time of the progressive signal. The pulldown error detecting unit 28 having the configuration of FIG. 3 determines whether a double image has occurred using this correlation difference.

Difference absolute value calculating units 34 to 37 calculate the absolute value of a difference in pixel data between adjacent lines. Specifically, the difference absolute value calculating unit 34 calculates the absolute value of a difference between the signal A and the signal B. The difference absolute value calculating unit 35 calculates the absolute value of a difference between the signal B and the signal C. Similarly, the difference absolute value calculating unit 36 calculates the absolute value of a difference between the signal C and the signal D. The difference absolute value calculating unit 37 calculates the absolute value of a difference between the signal D and the signal E. A one-line difference absolute value average calculating unit 38 calculates an average value of the difference absolute values calculated by the difference absolute value calculating units 34 to 37. The one-line difference absolute value average calculating unit 38 supplies the average value to a flip-flop (FF) 39. When supplied with the average values of one-line difference absolute values for five neighboring pixels by flip-flops 39 to 42, a neighborhood average calculating unit 43 calculates an average value for the five neighboring pixels. The neighborhood average calculating unit 43 supplies this average value to a double image detecting unit 53.

Meanwhile, difference absolute value calculating units 44 to 46 calculate the absolute value of a difference in pixel data between alternate lines. Specifically, the difference absolute value calculating unit 44 calculates the absolute value of a difference between the signal A and the signal C. The difference absolute value calculating unit 45 calculates the absolute value of a difference between the signal B and the signal D. The difference absolute value calculating unit 46 calculates the absolute value of a difference between the signal C and the signal E. A two-line difference absolute value average calculating unit 47 calculates an average value of the difference absolute values calculated by the difference absolute value calculating units 44 to 46. The two-line difference absolute value average calculating unit 47 supplies the average value to a flip-flop 48. When supplied with the average values of two-line difference absolute values for five neighboring pixels by flip-flops 48 to 51, a neighborhood average calculating unit 52 calculates an average value for the five neighboring pixels. The neighborhood average calculating unit 52 supplies this average value to the double image detecting unit 53.

The double image detecting unit 53 compares the average value supplied from the neighborhood average calculating unit 43 with the average value supplied from the neighborhood average calculating unit 52. When the latter is smaller, that is, when correlation between alternate lines is stronger, the double image detecting unit 53 determines that a double image error has occurred, and supplies a signal indicating that a double image error has occurred to an output selecting unit 55. In addition, the double image detecting unit 53 counts pixels judged to be a double image error. When a count value has reached a predetermined threshold value, the double image detecting unit 53 supplies a signal indicating that the count value has reached the predetermined threshold value to the output selecting unit 55, and supplies a reset signal as described above to the pulldown detecting unit 25. Incidentally, the double image detecting unit 53 resets the count value in the V-period of the image.

Figure 5:
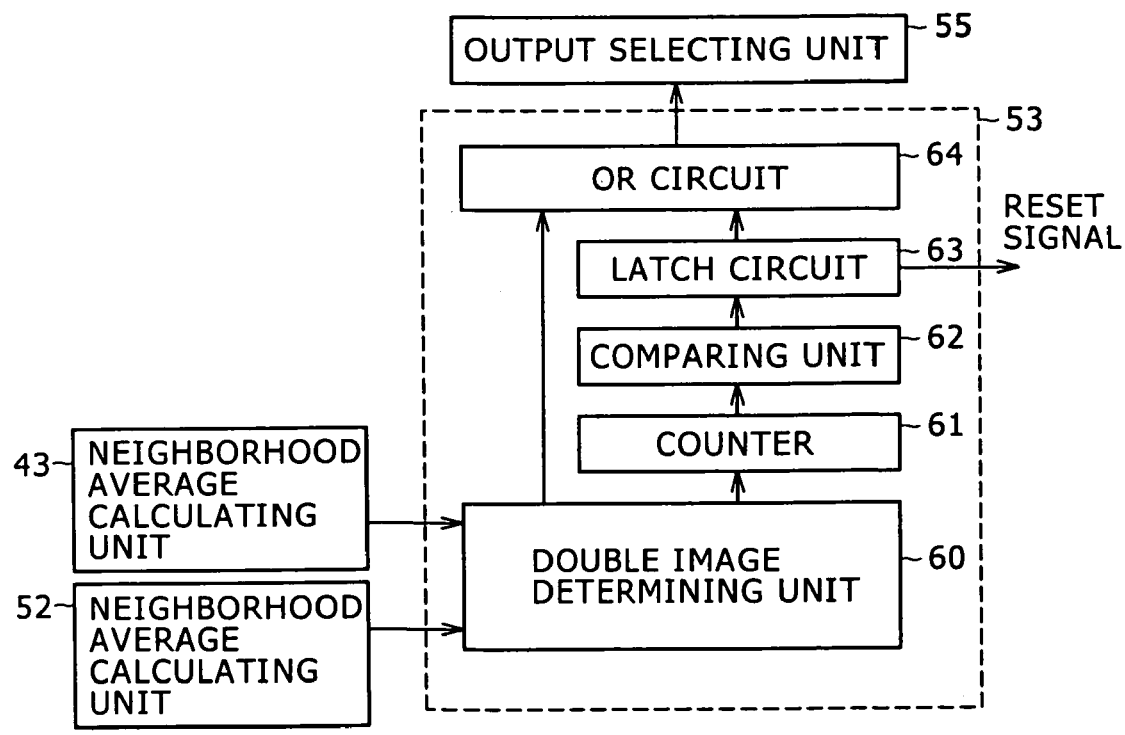
FIG. 5 is a diagram showing an example of internal configuration of a double image detecting unit in the pulldown error detecting unit.

FIG. 5 shows an example of internal configuration of the double image detecting unit 53. A double image determining unit 60 compares the average value supplied from the neighborhood average calculating unit 43 with the average value supplied from the neighborhood average calculating unit 52. When the latter is smaller, that is, when correlation between alternate lines is stronger, the double image determining unit 60 determines that a double image error has occurred, and supplies a signal indicating that a double image error has occurred to a counter 61 and an OR circuit 64. The counter 61 counts the number of pixels judged to be a double image error, and supplies a count value to a comparing unit 62. The comparing unit 62 supplies a result of comparison of the present count value with a predetermined threshold value to a latch circuit 63. When the count value has reached the predetermined threshold value, a signal indicating that the count value has reached the predetermined threshold value is supplied from the latch circuit 63 to the OR circuit 64. In addition, when the count value has reached the predetermined threshold value, there is a strong possibility that the pulldown sequence is disrupted. Thus, in order to reset the state transition model of the pulldown detecting unit 25, the above-described reset signal is supplied from the latch circuit 63 to the pulldown detecting unit 25. The OR circuit 64 supplies a signal as a logical sum of the signal supplied from the double image determining unit 60 and the signal supplied from the latch circuit 63 to the output selecting unit 55. Incidentally, the counter 61, the comparing unit 62, and the latch circuit 63 are reset in the V-period of the image.

Returning to FIG. 3, the output selecting unit 55 is supplied with the motion adaptive type interpolation signal delayed by a time corresponding to two lines by a two-line delay device 54, the signal C, and the result of the pulldown detection. When a signal indicating that a double image error has occurred is supplied from the double image detecting unit 53 to the output selecting unit 55, the output selecting unit 55 replaces a pixel in the signal C (field-interpolated signal) with a pixel at the same position in the motion adaptive type interpolation signal, and outputs the result, thereby avoiding the occurrence of a double image error. In addition, when a signal indicating that the count value has reached the predetermined threshold value is supplied from the double image detecting unit 53 to the output selecting unit 55, the output selecting unit 55 is fixed to select the motion adaptive type interpolation signal for all of subsequent pixels or lines, thereby avoiding the occurrence of a double image error. Incidentally, this fixation is cancelled when the pulldown detecting unit 25 detects 3-2 pulldown or 2-2 pulldown again after being reset, and supplies a result of pulldown detection to the output selecting unit 55.

Figure 6:
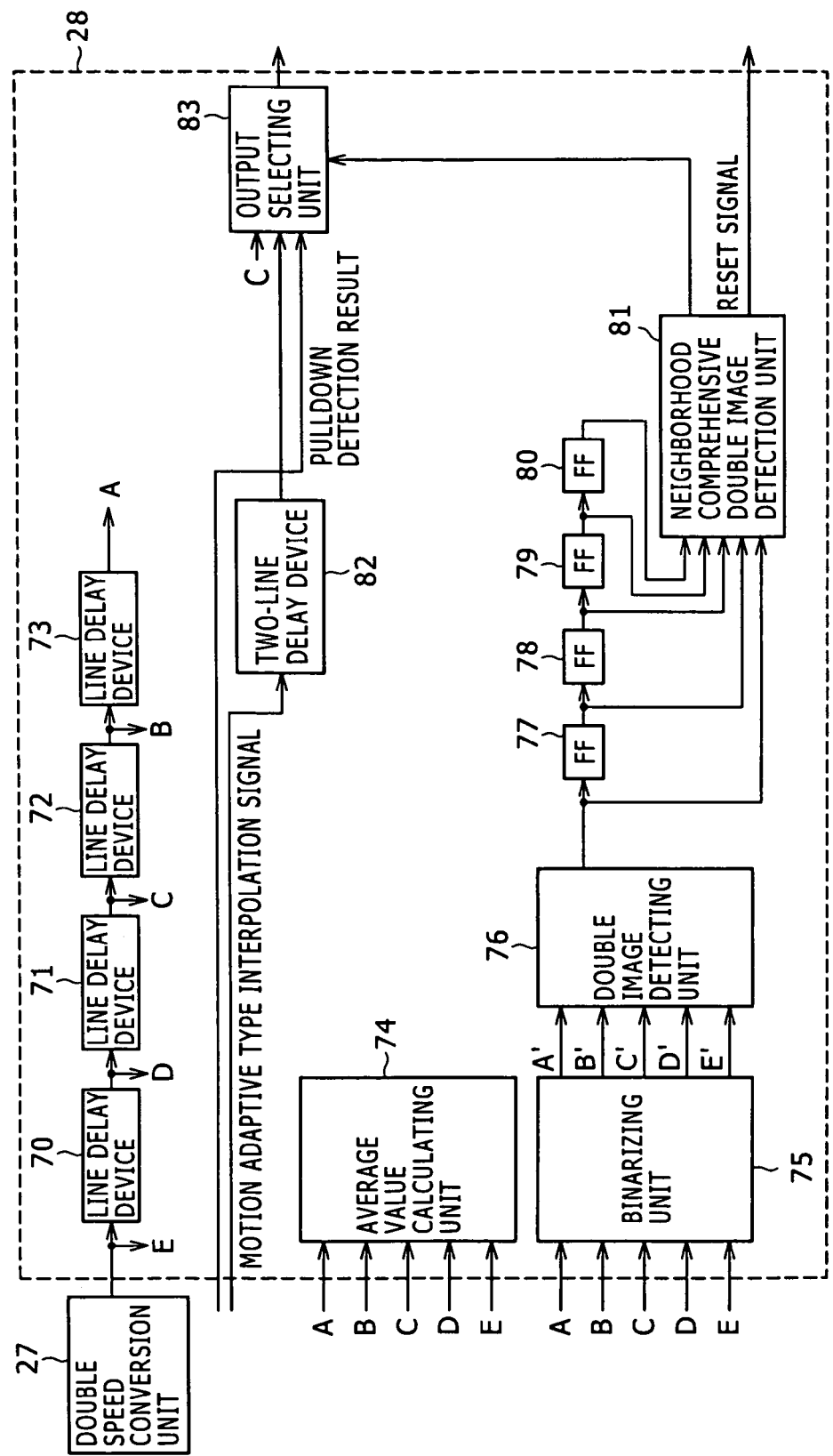
FIG. 6 is a diagram showing another example of internal configuration of a pulldown error detecting unit in the progressive conversion unit.

FIG. 6 shows another example of internal configuration of the pulldown error detecting unit 28. As in FIG. 3, the field-interpolated signal supplied from the double speed conversion unit 27 is delayed by a time corresponding to one line by a line delay device 70. The field-interpolated signal is further delayed by a time corresponding to one line by each of line delay devices 71, 72, and 73. Finally, signals A, B, C, D, and E are obtained.

An average value calculating unit 74 calculates an average value of the signals A, B, C, D, and E. A binarizing unit 75 converts the signals A, B, C, D, and E into binary signals A', B', C', D', and E'. Specifically, when pixel data is larger than the average value of the signals A, B, C, D, and E, the binarizing unit 75 converts the pixel data to "1", for example. When the pixel data is smaller than the average value of the signals A, B, C, D, and E, the binarizing unit 75 converts the pixel data to "0", for example. A double image detecting unit 76 determines that a double image error has occurred when a binary pattern of five lines matches a predetermined pattern.

FIG. 7 shows an example of a binary pattern of five lines. When a binary pattern of five lines matches a pattern (1, 0, 1, 0, 1) or (0, 1, 0, 1, 0) as shown in FIG. 7, that is, when correlation between alternate lines is stronger, the double image detecting unit 76 determines that there is a double image error, and supplies the determination result to a flip-flop 77. When supplied with results of double image determination for five neighboring pixels on the same scanning line by flip-flops 77 to 80, a neighborhood comprehensive double image detection unit 81 comprehensively determines whether a double image error has occurred from the determination results for the five neighboring pixels. When the neighborhood comprehensive double image detection unit 81 determines that a double image error has occurred, the neighborhood comprehensive double image detection unit 81 supplies a signal indicating that a double image error has occurred to an output selecting unit 83. For example, the neighborhood comprehensive double image detection unit 81 determines that a double image error has occurred when all the binary patterns of the five neighboring pixels match the above-described double image pattern. In addition, the neighborhood comprehensive double image detection unit 81 counts pixels judged to be a double image error. When a count value has reached a predetermined threshold value, the neighborhood comprehensive double image detection unit 81 supplies a signal indicating that the count value has reached the predetermined threshold value to the output selecting unit 83, and supplies a reset signal as described above to the pulldown detecting unit 25. Incidentally, the neighborhood comprehensive double image detection unit 81 resets the count value in the V-period of the image.

The output selecting unit 83 is supplied with the motion adaptive type interpolation signal delayed by a time corresponding to two lines by a two-line delay device 82, the signal C, and the result of the pulldown detection. When a signal indicating that a double image error has occurred is supplied from the neighborhood comprehensive double image detection unit 81 to the output selecting unit 83, the output selecting unit 83 replaces a pixel in the signal C (field-interpolated signal) with a pixel at the same position in the motion adaptive type interpolation signal, and outputs the result, thereby avoiding the occurrence of a double image error. In addition, when a signal indicating that the count value has reached the predetermined threshold value is supplied from the neighborhood comprehensive double image detection unit 81 to the output selecting unit 83, the output selecting unit 83 is fixed to select the motion adaptive type interpolation signal for all of subsequent pixels or lines, thereby avoiding the occurrence of a double image error. Incidentally, this fixation is cancelled when the pulldown detecting unit 25 detects 3-2 pulldown or 2-2 pulldown again after being reset, and supplies a result of pulldown detection to the output selecting unit 83.

Figure 8:
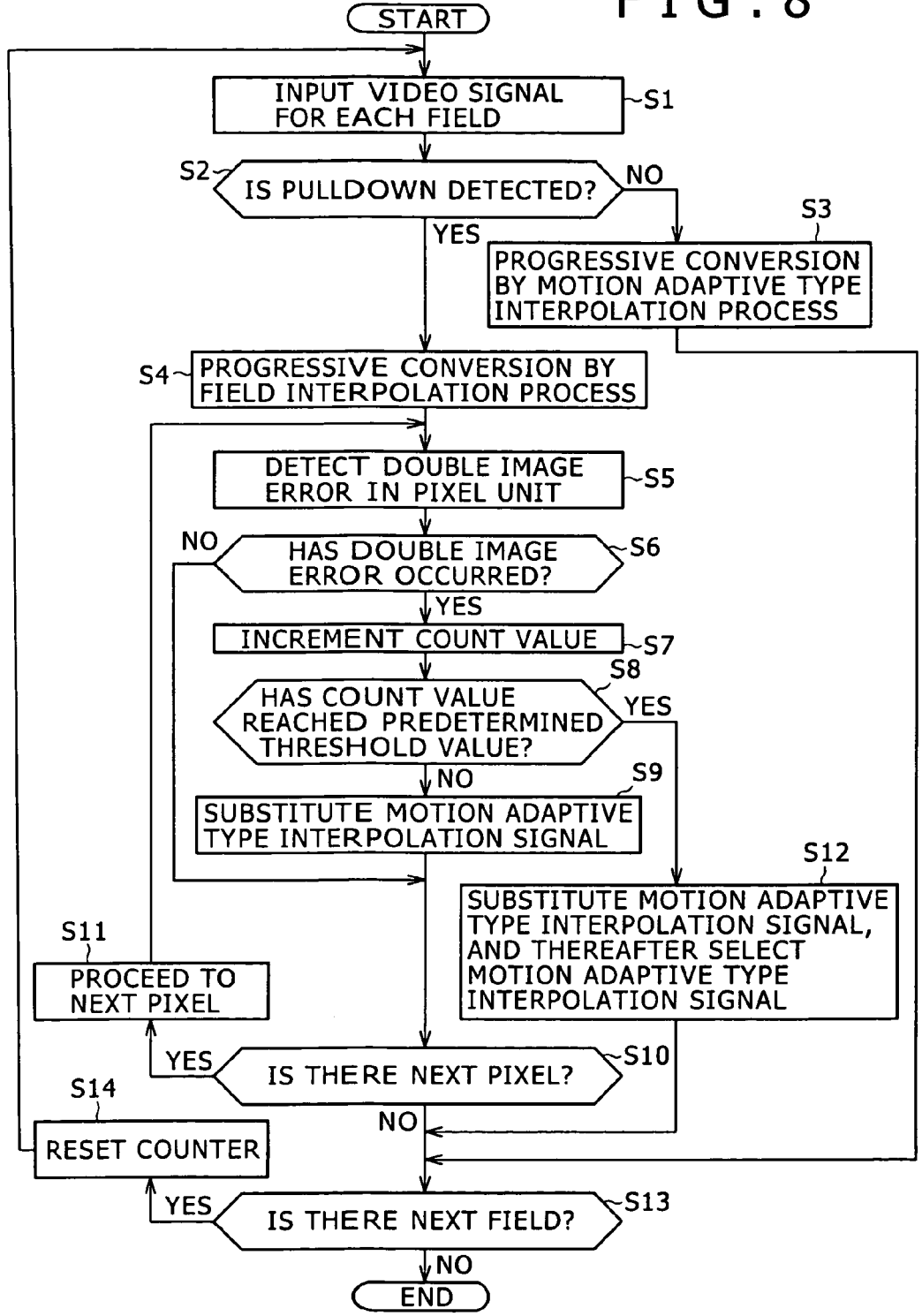
FIG. 8 is a flowchart of assistance in explaining a process procedure of the progressive conversion unit.
Figures 9A, 9B, 9C:
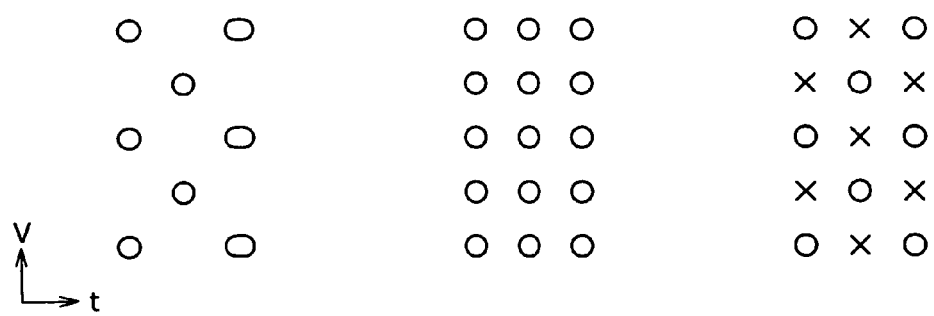
FIGS. 9A, 9B, and 9C are diagrams showing various scanning line structures, FIG. 9A representing an interlaced signal, FIG. 9B representing a progressive signal, and FIG. 9C representing a signal obtained by converting an interlaced signal into a progressive signal by scanning line interpolation.
Figure 10:
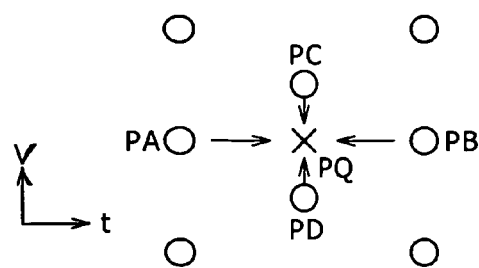
FIG. 10 is a diagram of assistance in explaining inter-field interpolation and intra-field interpolation.
Figure 11:
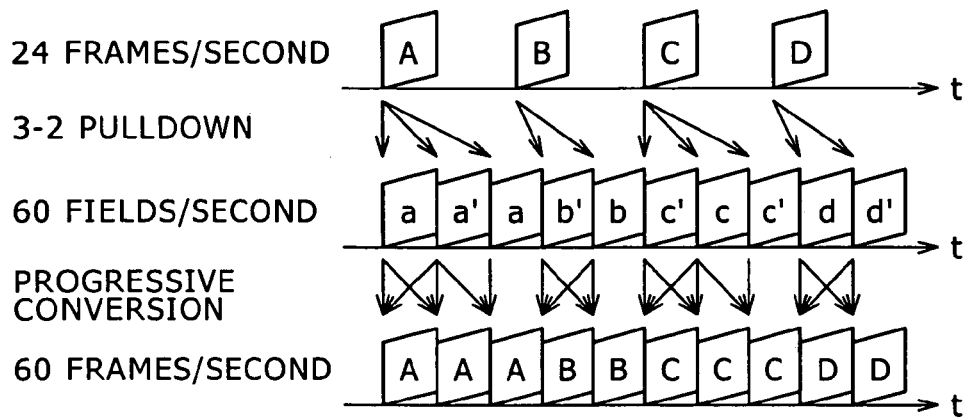
FIG. 11 is a diagram of assistance in explaining 3-2 pulldown.
Figure 12:
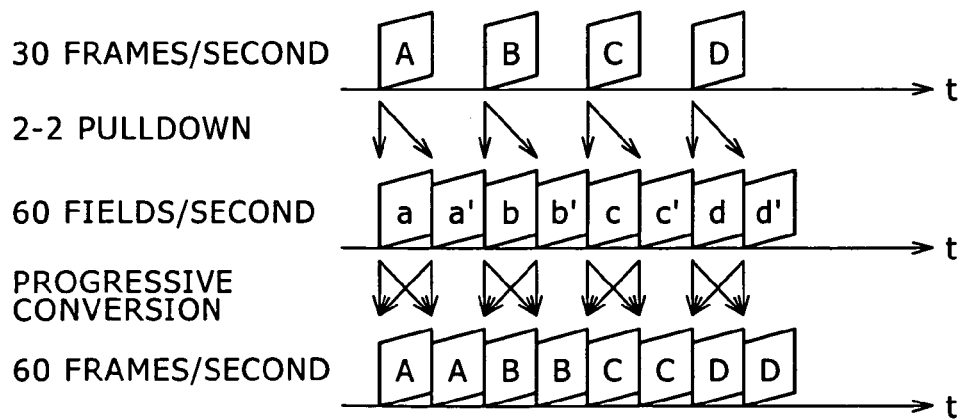
FIG. 12 is a diagram of assistance in explaining 2-2 pulldown.
Figure 13:
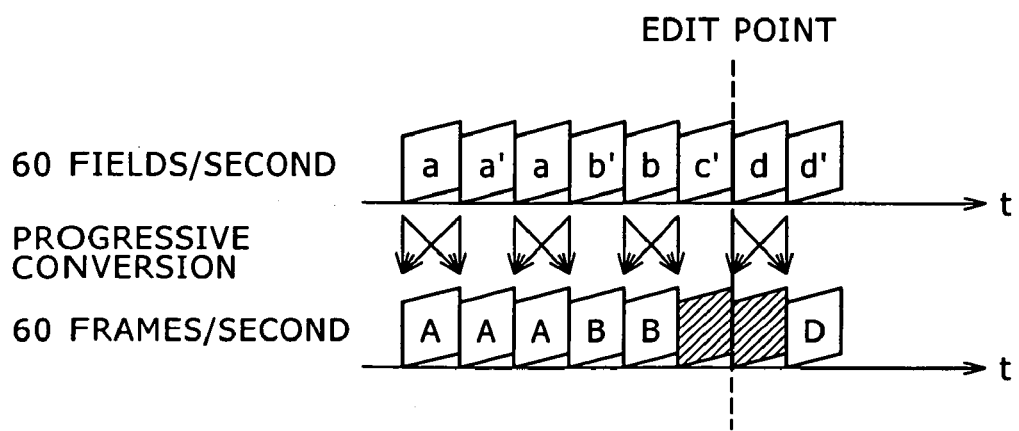
FIG. 13 is a diagram of assistance in explaining a problem when an interlaced signal converted to an interlaced signal by 3-2 pulldown and resulting from an editing process is converted into a progressive signal.

A process procedure of the above-described progressive conversion unit 11 will be described below with reference to a flowchart of FIG. 8. In first step S1, a video signal is input for each field. In step S2, whether a field being processed is a field originating from film video is determined by detecting 3-2 pulldown or 2-2 pulldown. When 3-2 pulldown or 2-2 pulldown is not detected, the field originates from normal video. Therefore, in step S3, the video signal is converted into a progressive signal by a motion adaptive type interpolation process. The process then proceeds to step S13. When 3-2 pulldown or 2-2 pulldown is detected, on the other hand, the field originates from film video. Therefore, in step S4, the video signal is converted into a progressive signal by a field interpolation process. The process then proceeds to step S5.

In step S5, whether a double image error has occurred is detected in a pixel unit. In step S6, whether a double image error has occurred is determined. When it is determined in step S6 that a double image error has occurred, the process proceeds to step S7. When it is determined in step S6 that no double image error has occurred, the process proceeds to step S10.

In step S7, the count value of the counter is incremented. In step S8, whether the count value has reached a predetermined threshold value is determined. When the count value has not reached the predetermined threshold value, the pixel is replaced with a pixel at the same position in a motion adaptive type interpolation signal in step S9. The process proceeds to step S10. In step S10, whether there is a next pixel is determined. When there is a next pixel, the process proceeds to the next pixel in step S11, and then returns to step S5. When there is not a next pixel, the process proceeds to step S13. When the count value has reached the predetermined threshold value in step S8, on the other hand, the pixel is replaced with a pixel at the same position in the motion adaptive type interpolation signal, and the motion adaptive type interpolation signal is selected for all of subsequent pixels or lines in step S12. Further, the state transition model of the pulldown detecting unit 25 is reset. The process proceeds to step S13.

In step S13, whether there is a next field is determined. When there is a next field, the counter is reset in step S14. The process then returns to step S1. When there is not a next field, the process is ended.

As described above, when an interlaced signal including a converted signal converted into an interlaced signal by 3-2 pulldown or 2-2 pulldown and resulting from an editing process is converted into a progressive signal, the progressive conversion unit 11 in the present embodiment generates a field-interpolated signal and a motion adaptive type interpolation signal, detects a double image error in the field-interpolated signal in a pixel unit, replaces a pixel judged to be a double image error with a pixel at the same position in the motion adaptive type interpolation signal, and selects the motion adaptive type interpolation signal for subsequent pixels or lines when the number of pixels judged to be a double image error has reached a predetermined threshold value. It is thereby possible to avoid the double image error that greatly degrades image quality, and generate the progressive signal of higher quality.

It is to be noted that the present invention is not limited to only the foregoing embodiment, and is of course susceptible of various modifications without departing from the spirit of the present invention.

For example, while the foregoing embodiment performs double image error detection using information of five vertical lines and five horizontal pixels, the present invention is not limited to this, and the number of lines and the number of pixels may be increased or decreased.

In addition, while in the foregoing embodiment, description has been made of a case where a frame rate is 60 fields per second, the present invention is not limited to this, and is widely applicable to signals with desired frame rates based on various formats, such as a PAL signal displayed at a frame rate of 50 fields per second.

Further, the present invention is widely applicable to signals with a frame rate changed by arranging pictures of original images on the basis of a predetermined sequence other than 3-2 pulldown or 2-2 pulldown.

Further, description has been made of an embodiment in which a field-interpolated signal is replaced with a motion adaptive type interpolation signal when the pulldown detecting unit 25 detects a double image error. However, the present invention is not limited to this. For example, the field-interpolated signal may be replaced with a signal obtained simply by intra-field interpolation. Thus, the present invention is widely applicable to cases where the field-interpolated signal is replaced with another signal for remedying a double image.

It should be understood by those skilled in the art that various modifications, combinations, sub-combinations and alterations may occur depending on design requirements and other factors insofar as they are within the scope of the appended claims or the equivalents thereof.

The invention claimed is:

1. An image processing apparatus for converting an interlaced signal into a progressive signal, the interlaced signal including a signal converted so as to be matched to a frame rate of an input video signal with original images arranged on a basis of a predetermined sequence as the video signal, the image processing apparatus comprising:
    field-interpolated signal generating means for generating a progressive field-interpolated signal by interpolating a signal at a selected position corresponding to a scanning line to be interpolated in a present field, the signal at the selected position belonging to one of a field preceding the present field and a field succeeding the present field; and
    double image detecting means for determining whether a pixel in the field-interpolated signal forms a part of a double image, and for replacing a pixel in the field-interpolated signal which forms a part of a double image with a predetermined substitute signal;
    wherein if the number of pixels in the field-interpolated signal which form parts of the double image reaches a predetermined threshold value, the double image detecting means replaces signals of pixels or lines to be output after the predetermined threshold value is reached in the field-interpolated signal with the predetermined substitute signal.

2. The image processing apparatus as claimed in claim 1, wherein the converted signal is a signal converted into an interlaced signal by one of 3-2 pulldown and 2-2 pulldown.

3. The image processing apparatus as claimed in claim 1, further comprising interpolated signal generating means for generating a progressive interpolated signal by one of intra-field interpolation from scanning lines situated above and below the scanning line to be interpolated in the present field and inter-field interpolation from signals at a position corresponding to the scanning line to be interpolated in a field preceding the present field and a field succeeding the present field,
    wherein when the double image detecting means determines that a pixel forms a part of a double image, the double image detecting means replaces the pixel with the interpolated signal generated by the interpolated signal generating means.

4. The image processing apparatus as claimed in claim 3,
    wherein the interpolated signal generating means includes motion detecting means for detecting temporal motion of an image of the present field,
    when the motion detecting means detects motion, the interpolated signal generating means generates the interpolated signal by the intra-field interpolation, and
    when the motion detecting means does not detect motion, the interpolated signal generating means generates the interpolated signal by the inter-field interpolation.

5. The image processing apparatus as claimed in claim 1, wherein the double image detecting means determines whether a target pixel in the field-interpolated signal is a pixel forming a part of the double image based on a correlation between predetermined pixels in a plurality of consecutive scanning lines including a scanning line having the target pixel.

6. The image processing apparatus as claimed in claim 5, wherein the double image detecting means determines whether the target pixel is a pixel forming a part of the double image based on a correlation between predetermined pixels on a straight line orthogonal to the scanning line including the target pixel.

7. The image processing apparatus as claimed in claim 5, wherein the double image detecting means determines that the target pixel is a pixel forming a part of the double image if a correlation between pixels of alternate scanning lines of the plurality of scanning lines is stronger than a correlation between pixels of adjacent scanning lines of the plurality of scanning lines.

8. The image processing apparatus as claimed in claim 5, wherein the double image detecting means obtains the correlation for a plurality of consecutive pixels on the scanning line including the target pixel, and determines whether the target pixel is a pixel forming a part of the double image.

9. The image processing apparatus as claimed in claim 1, wherein the double image detecting means obtains a binary pattern in which a plurality of pixels on a straight line orthogonal to a scanning line including a target pixel in a plurality of consecutive scanning lines including the scanning line to which the target pixel in the field-interpolated signal belongs are classified into two values, and based on the binary pattern, the double image detecting means determines whether the target pixel is a pixel forming a part of the double image.

10. The image processing apparatus as claimed in claim 9, wherein the double image detecting means obtains the binary pattern by classifying the plurality of pixels on the straight line orthogonal to the scanning line including the target pixel into the two values based on a relation in magnitude between pixel values of the plurality of pixels and an average of the pixel values of the plurality of pixels.

11. The image processing apparatus as claimed in claim 9, wherein the double image detecting means obtains the binary pattern for a plurality of consecutive pixels on the scanning line including the target pixel, and determines whether the target pixel is a pixel forming a part of the double image.

12. An image processing apparatus, comprising:
a first interpolating unit operable to generate a progressive interpolated signal by subjecting an input interlaced signal to an interpolation process;
a correlation detecting unit operable to detect a correlation between pixels of adjacent scanning lines and a correlation between pixels of alternate scanning lines among a plurality of consecutive scanning lines including a scanning line to which a target pixel in the progressive interpolated signal belongs; and
a replacing unit operable to replace the target pixel with a predetermined substitute signal if the correlation between the pixels of the alternate scanning lines is stronger than the correlation between the pixels of the adjacent scanning lines.

13. The image processing apparatus as claimed in claim 12, further comprising a second interpolating unit operable to generate a progressive interpolated signal different from the progressive interpolated signal generated by the first interpolating unit,
wherein the substitute signal is the interpolated signal generated by the second interpolating unit.

14. The image processing apparatus as claimed in claim 12, further comprising a sequence detecting unit operable to detect a field sequence based on a correlation between fields from the input interlaced signal,
wherein if the sequence detecting unit detects a predetermined field sequence, the interpolated signal of the first interpolating unit is supplied to the correlation detecting unit.

15. The image processing apparatus as claimed in claim 14, wherein the substitute signal is supplied to the correlation detecting unit if the sequence detecting unit does not detect the predetermined field sequence.

16. The image processing apparatus as claimed in claim 15, further comprising a second interpolating unit operable to generate a progressive interpolated signal different from the progressive interpolated signal generated by the first interpolating unit,
wherein the substitute signal is the interpolated signal generated by the second interpolating unit.

17. The image processing apparatus as claimed in claim 15, wherein
the first interpolating unit generates a field-interpolated signal, and
the second interpolating unit generates a motion adaptive type interpolation signal.

18. An image processing method for converting an interlaced signal into a progressive signal, the interlaced signal including a signal converted so as to be matched to a frame rate of an input video signal with original images arranged on a basis of a predetermined sequence as the video signal, the image processing method comprising:

generating a progressive field-interpolated signal by interpolating a signal at a selected position corresponding to a scanning line to be interpolated in a present field, the signal at the selected position belonging to one of a field preceding the present field and a field succeeding the present field;
determining whether a pixel in the field-interpolated signal forms a part of a double image of the field-interpolated signal; and
replacing a pixel in the field-interpolated signal which forms a part of a double image in the field-interpolated signal with a predetermined substitute signal;
wherein if the number of pixels in the field-interpolated signal which form parts of the double image reaches a predetermined threshold value, signals of pixels or lines to be output after the predetermined threshold value is reached in the field-interpolated signal are replaced with the predetermined substitute signal.

19. An image processing method, comprising:
generating a progressive interpolated signal by subjecting an input interlaced signal to an interpolation process;
detecting a correlation between pixels of adjacent scanning lines and a correlation between pixels of alternate scanning lines among a plurality of consecutive scanning lines including a scanning line to which a target pixel in the progressive interpolated signal belongs; and
replacing the target pixel with a predetermined substitute signal if the correlation between the pixels of the alternate scanning lines is stronger than the correlation between the pixels of the adjacent scanning lines.

20. An image processing apparatus for converting an interlaced signal into a progressive signal, the interlaced signal including a signal converted so as to be matched to a frame rate of an input video signal with original images arranged on a basis of a predetermined sequence as the video signal, the image processing apparatus comprising:
a field-interpolated signal generator generating a progressive field-interpolated signal by interpolating a signal at a selected position corresponding to a scanning line to be interpolated in a present field, the signal at the selected position belonging to one of a field preceding the present field and a field succeeding the present field; and
a double image detector determining whether a pixel in the field-interpolated signal forms a part of a double image, and replacing a pixel in the field-interpolated signal which forms a part of a double image in the field-interpolated signal with a predetermined substitute signal;
wherein if the number of pixels in the field-interpolated signal which form parts of the double image reaches a predetermined threshold value, the double image detector replaces signals of pixels or lines to be output after the predetermined threshold value is reached in the field-interpolated signal with the predetermined substitute signal.

* * * * *